Oct. 2, 1956  D. M. NELSON  2,765,138
AUTOMOBILE REARVIEW MIRROR SUPPORT
Filed Dec. 13, 1951
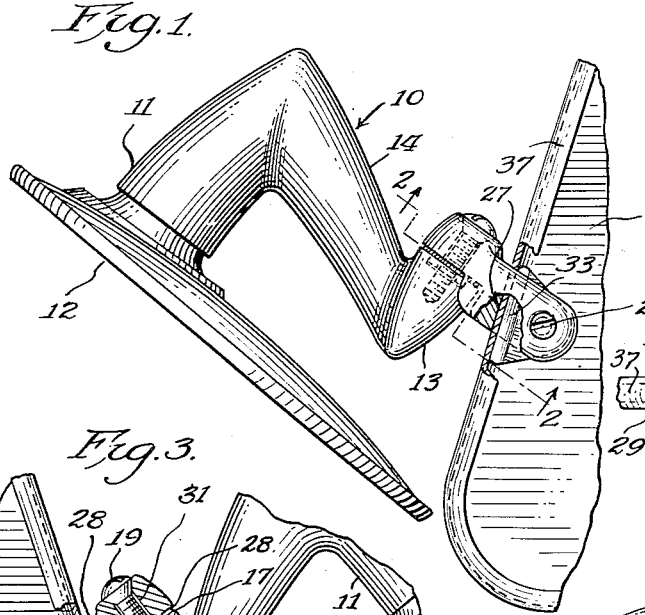
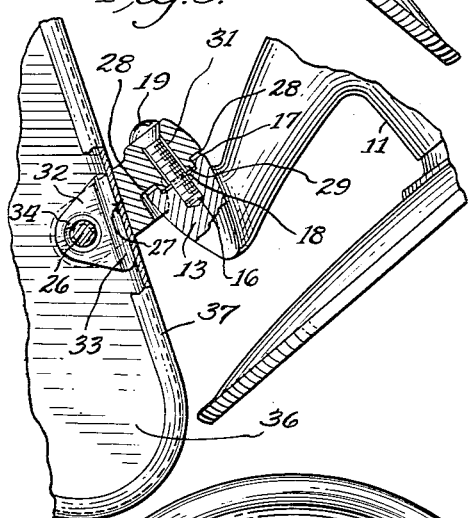
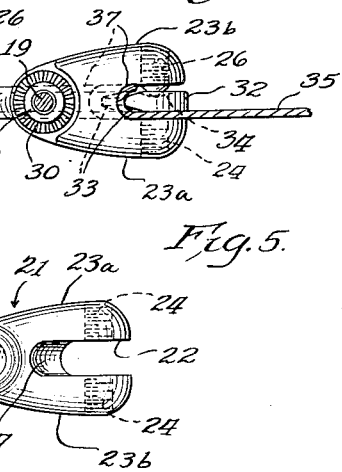
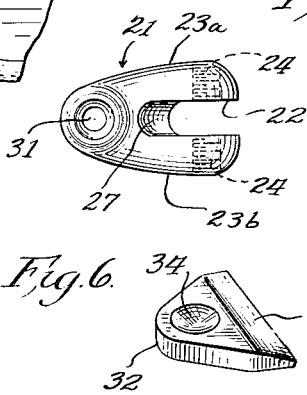
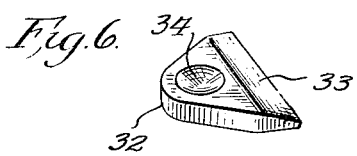
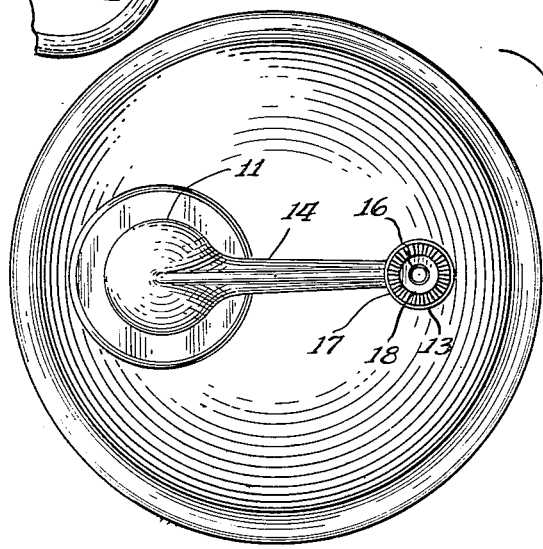
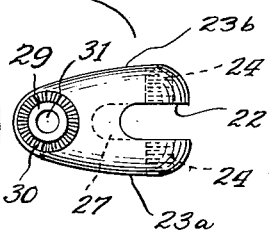
INVENTOR.
Dwight M. Nelson.
BY
Max R. Kraus
Atty.

United States Patent Office 2,765,138
Patented Oct. 2, 1956

2,765,138

AUTOMOBILE REARVIEW MIRROR SUPPORT

Dwight M. Nelson, Chicago, Ill.

Application December 13, 1951, Serial No. 261,460

5 Claims. (Cl. 248—226)

This invention relates generally to improvements in rear view mirrors and more particularly to improvements in supporting arms for rear view mirrors.

One of the objects of this invention is the provision of an adjustable supporting arm adapted for interchangeably mounting rear view mirrors on either the right or left hand side of an automotive vehicle.

Another object of my invention is the provision of a supporting arm for rear view mirrors in which a single structure is utilized for mounting a rear view mirror on either side of an automotive vehicle thereby eliminating the necessity for providing two separate structures, one adapted to be used only on one particular side of the vehicle.

Another object of my invention is the provision of a supporting arm for a rear view mirror which is simple in construction, readily installed and adjustable and durable in service.

Other and further objects and advantages of my invention will become apparent from the following description when considered in connection with the accompanying drawings in which:

Fig. 1 is a top plan view showing my improved supporting arm installed and attached to the rain deflector of an automotive vehicle.

Fig. 2 is a cross-sectional view taken substantially on line 2—2 of Fig. 1.

Fig. 3 is a view similar to Fig. 1 but showing the mirror supporting arm installed on the opposite side of an automotive vehicle.

Fig. 4 is a top plan view showing the parts in separated relation.

Fig. 5 is an elevational view of a detail of construction, and

Fig. 6 is a perspective view of another detail of construction.

Referring to the drawings, the numeral 10 indicates generally a mirror supporting arm which is generally Z-shaped although it will be understood that the said arm may be made to assume any suitable configuration. Connected in a conventional manner to the outer end 11 of the arm for swivel movement, is a mirror and backing assembly indicated by the numeral 12. The inner end 13 of the arm 10 is substantially conical in form and the axis thereof is disposed in angular relation to the axis of the intermediate portion 14 of the arm 10. The end portion 13 is provided with a central socket 16 and surrounding said socket is an annular flange 17 the face of which is provided with radially directed serrations 18. The arm portion 13 is threaded axially to receive a screw 19.

A mounting member generally indicated at 21 is formed with a slot 22 providing bifurcated arms 23a and 23b, the said arms being drilled and tapped as at 24 so that a set screw such as 26 may be threaded into each of the tapped openings 24 from either side. The bottom 27 of the slot 22 is angularly inclined, as illustrated more clearly in Fig. 5. The opposite end of the connecting member 21 is recessed as at 28 and is provided with a central annular projection 29 which is adapted to be received within the socket 16. The face of the recessed portion surrounding the projection 29 is provided with serrations 30 complementary to the serrations 18 so that when the connecting member 21 is assembled to the arm portion 13, as illustrated in Fig. 3, the respective serrated surfaces are brought into engagement. The member 21 is bored as at 31 to receive the screw 19, the said screw serving to secure the connecting member 21 to the arm portion 13.

A bearing member 32 illustrated in Fig. 6 is substantially triangular in form and is provided with a beveled edge 33 corresponding to the base of the triangular form and a recess 34 on one face thereof. As will be seen particularly to Figs. 1, 2 and 3, the bearing member 32 is adapted to be engaged by the set screw 26 with the conical end of the set screw received in the recess or depression 34 of the plate 32.

The device of my invention is adapted to be mounted on the rain deflector of an automotive vehicle. Certain conventional types of automotive vehicles which are provided with "no-draft" windows in the forward doors thereof have mounted on the door frames above the "no-draft" windows substantially triangular formed rain deflectors such as indicated by the numerals 35 and 36. It is to these rain deflectors that the mirror supporting arm of my invention is adapted to be connected. Since both the right and left hand doors of an automotive vehicle of the type described are each provided with correspondingly disposed rain deflectors, as is illustrated in Figs. 1 and 3, it will be apparent that if conventional mirror supporting means were employed, two separate types of mirror supporting constructions would be required to be used, it being obvious that one adapted for installation on the left hand side of an automotive vehicle could not be used on the right hand side of the said vehicle. My invention, however, obviates such a disadvantage and permits a single construction to be used on either side of the automotive vehicle.

In Fig. 1 is illustrated the mirror 12 and its supporting arm 10 as mounted on the rain deflector disposed on the left hand side of an automotive vehicle. As will be seen, the bearing plate 32 is supported on the rain deflector 35, its beveled edge 33 being in abutment with the inturned flange 37 along the edge of the said deflector. The edge portion of the deflector 35 is received in the slot 22 between the furcations 23a, 23b. Upon tightening of the set screw 26, the connecting member 21 is securely clamped to the rain deflector. The supporting arm 10 may then be adjusted by rotation of the said arm about the axis of the screw 19 which is, of course, first loosened to permit relative movement between the respective serrations 18 and 30. It will be also understood that the mirror 12 may be universally rotated with relation to the arm portion 11 so as to position it in a desired position of adjustment. As will be observed in Fig. 1, the flange 37 of the rain deflector 35 is adapted to abut the bottom 27 of the slot 22.

In order to adapt the mirror supporting arm 10 for mounting on the right hand or opposite side of the automotive vehicle, the set screw 26 is withdrawn from the furcation 23a and threaded into the furcation 23b. Then by turning over the entire device to the position illustrated in Fig. 3, it will be seen that the set screw 26 is in the same relative position as that illustrated in Figs. 1 and 2 with the arm 10 oppositely directed so that the connecting member 21 may be attached to the rain deflector 36 on the right hand side of the automotive vehicle. Correspondingly as in the first instance, the arm 10 and mirror 12 may be adjusted as hereinbefore described.

It will be apparent from the foregoing that I have provided a simple rear view mirror support which may be used interchangeably on both the right and left hand sides of automotive vehicles without any alteration in construction.

I claim:

1. A rear view mirror support comprising an arm having serrations on the inner end thereof, a reversible connecting member having a serrated outer surface parallel to the longitudinal axis of said connecting member for abutting relation with said arm serrations and permitting relative adjustment between said arm and connecting member, an element for securing said arm to said connecting member, said element being horizontally disposed and at right angles to the longitudinal axis of said connecting member, said reversible connecting member having a pair of arms and a space therebetween and adapted to engage the projecting portion at either side of an automotive vehicle adjacent the window thereof, said arms having internally threaded openings in axial alinement, a bearing member adapted to be positioned in the space between the arms and adapted to engage the inside of the projecting portion on either side of the automotive vehicle, said pair of arms of said reversible connecting member adapted to be selectively positioned on the projecting portions at either side of the vehicle so that one of the pair of arms forms the upper arm when positioned on one side of the vehicle and when said connecting member is reversed and positioned on the other side of the vehicle the other arm forms the upper arm, and a screw selectively engaged in the upper arm opening to engage the top of said bearing member to lock said connecting member to said projecting portion.

2. A rear view mirror support comprising an arm having serrations on the inner end thereof, a reversible connecting member having a serrated outer surface parallel to the longitudinal axis of said connecting member for abutting relation with said arm serrations and permitting relative adjustment between said arm and connecting member, an element for securing said arm to said reversible connecting member, said element being horizontally disposed and at right angles to the longitudinal axis of said connecting member, said reversible connecting member having a pair of arms and a slot therebetween and adapted to engage the projecting portion at either side of an automotive vehicle adjacent the window thereof, said arms having internally threaded openings in axial alinement, a bearing member having a beveled edge adapted to be positioned in the slot with the beveled edge engaging the inside of the projecting portion on either side of a vehicle, said pair of arms of said reversible connecting member adapted to be selectively positioned on the projecting portions at either side of the vehicle so that one of the pair of arms forms the upper arm when positioned on one side of the vehicle and when said connecting member is reversed and positioned on the other side of the vehicle the other arm forms the upper arm, and a screw in the upper arm opening to engage the top of said bearing member to lock said connecting member to said projecting portion.

3. A rear view mirror support comprising a Z shaped arm having serrations on the inner end thereof, a reversible connecting member having a serrated outer surface parallel to the longitudinal axis of said connecting member for abutting relation with said arm serrations and permitting relative adjustment between said arm and connecting member, a screw element for securing said arm to said reversible connecting member, said element being horizontally disposed and at right angles to the longitudinal axis of said connecting member, said reversible connecting member having a pair of arms and a slot therebetween and adapted to engage the triangular shaped rain deflector at either side of an automotive vehicle, the bottom of said slot being angularly inclined and engaging the outside of the flange of said deflector, said arms having internally threaded openings, a bearing member having an edge adapted to be positioned in the slot with the edge engaging the inside of the flange of said rain deflector, and a screw in said arm openings to engage said bearing member to lock said connecting member to said rain deflector.

4. A rear view mirror support comprising an arm having serrations on the inner end thereof, a reversible connecting member having an outer face vertically disposed and parallel with the longitudinal axis of the connecting member, said face having serrations for abutting relation with said arm serrations and permitting relative adjustment between said arm and connecting member, an element for securing said arm to said connecting member, said element disposed at right angles to the longitudinal axis of said connecting member, said reversible connecting member having a pair of arms and a space therebetween and adapted to engage the projecting portion at either side of an automotive vehicle adjacent the window thereof, said arms having internally threaded openings in axial alinement, said pair of arms of said reversible connecting member adapted to be selectively positioned on the projecting portion at either side of the vehicle so that one of the pair of arms forms the upper arm when positioned on one side of the vehicle and when said connecting member is reversed and positioned on the other side of the vehicle the other arm forms the upper arm, and a screw selectively engaged in the upper arm opening to engage said projecting portion to lock said connecting member to said projecting portion.

5. A rear view mirror support comprising a Z shaped arm having a socket at the inner end thereof and a surrounding serrated surface, a reversible connecting member having an outer face vertically disposed and parallel with the longitudinal axis of the connecting member, said face having a central annular projection received in said socket and a serrated surface for abutting relation with said arm serrations and permitting relative adjustment between said arm and connecting member, an element for securing said arm to said connecting member, said element disposed at right angles to the longitudinal axis of said connecting member, said reversible connecting member having a pair of arms and a slot therebetween and adapted to engage the projecting portion at either side of an automotive vehicle adjacent the window thereof, said arms having internally threaded openings in axial alinement, said pair of arms of said reversible connecting member adapted to be selectively positioned on the projecting portion at either side of the vehicle so that one of the pair of arms forms the upper arm when positioned on one side of the vehicle and when said connecting member is reversed and positioned on the other side of the vehicle the other arm forms the upper arm, and a screw engaged in the upper arm opening to engage said projecting portion to lock said connecting member to said projecting portion.

References Cited in the file of this patent

UNITED STATES PATENTS

| | | |
|---|---|---|
| 1,265,287 | Aufuldish | May 7, 1918 |
| 1,546,739 | Le Lande | July 21, 1925 |
| 1,834,682 | Colstad | Dec. 1, 1931 |
| 2,046,942 | Goeller | July 7, 1936 |
| 2,057,611 | Fischer | Oct. 13, 1936 |
| 2,533,475 | Koonter | Dec. 12, 1950 |
| 2,625,358 | Griffin | Jan. 13, 1953 |
| 2,644,658 | Reed | July 7, 1953 |